(12) United States Patent
Choi et al.

(10) Patent No.: US 7,594,575 B2
(45) Date of Patent: Sep. 29, 2009

(54) OPTICAL DISC PACKAGE

(75) Inventors: King Yeung Choi, Hong Kong (HK); Kwok Keung Kwong, Hong Kong (HK)

(73) Assignee: Encore Holdings Ltd., Nassau (BS)

( * ) Notice: Subject to any disclaimer, the term of this patent is extended or adjusted under 35 U.S.C. 154(b) by 266 days.

(21) Appl. No.: 11/752,170

(22) Filed: May 22, 2007

(65) Prior Publication Data

US 2008/0289981 A1    Nov. 27, 2008

(51) Int. Cl.
*B65D 85/57* (2006.01)
*E05D 7/10* (2006.01)

(52) U.S. Cl. .................... 206/308.1; 16/257

(58) Field of Classification Search .......... 206/308.1, 206/303, 307, 309, 387.1; 16/257, 259, 380, 16/260, 262, 386, DIG. 13
See application file for complete search history.

(56) References Cited

U.S. PATENT DOCUMENTS 5,238,107 A * 8/1993 Kownacki ............ 206/308.1
5,383,553 A * 1/1995 Lammerant et al. ......... 206/309
5,682,991 A * 11/1997 Lammerant et al. ...... 206/308.1
6,991,100 B2   1/2006 Delaere et al.
7,055,688 B2 * 6/2006 Watson et al. ............ 206/308.1

\* cited by examiner

*Primary Examiner*—J. Gregory Pickett
(74) *Attorney, Agent, or Firm*—Stephen M. De Klerk; Sonnenschein, Nath & Rosenthal LLP

(57) ABSTRACT

An optical disc package (10) for containing optical media (11), the package (10) being made solely from a resiliently flexible plastics material, the package (10) comprising: a first half (20) having protruding members (40) at a hinge portion (23) of the first half (20); and a second half (30) having recesses (50) at a hinge portion (33) of the second half (30), each recess (50) having an opening (51) which is constricted relative to the blind end (52) of the recess (50); wherein a pivotal connection is formed between the first and second halves (20, 30) such that the package (10) is moveable between an open position to access the optical media (11) and an enclosed position to protect the optical media (11) from damage, the pivotal connection being formed by sliding the protruding member (40) into the recess (50) causing the opening (51) to resiliently deform and allow the blind end (52) to receive the protruding member (40).

6 Claims, 3 Drawing Sheets

OPTICAL DISC PACKAGE

TECHNICAL FIELD

The invention concerns an optical disc package for containing optical media.

BACKGROUND OF THE INVENTION

A traditional jewel case is a compact disc case that has been used since 1982. It is a three-piece plastic case, measuring 142 mm×121.6 mm×10.4 mm, which usually contains a CD or DVD disc along with the liner notes and a back card. Two opposing transparent halves are hinged together to form the casing, the back half holding a media tray that grips the disc by its hole. A jewel case has two molded hemispherical plastic bearings in its hinges. All three parts are made of injection-molded polystyrene.

Polystyrene is not an environmentally friendly material. A 1986 EPA report on solid waste labeled the polystyrene manufacturing process as the fifth largest creator of hazardous waste. Also, polystyrene is difficult to recycle and consumes significant amounts of landfills.

Injection-molded polystyrene is rigid and fragile. Traditional jewel cases are known to easily crack if external force is applied onto the case. Also, they become permanently unhinged easily if the hinge area of the case is cracked. If the hinge area of the case has been damaged, it is no longer functional and the effectiveness of the case for storing optical media is reduced.

Accordingly, there is a desire to address at least some of the abovementioned problems.

SUMMARY OF THE INVENTION

In a first preferred aspect, there is provided an optical disc package for containing optical media, the package being made solely from a resiliently flexible plastics material, the package comprising:

a first half having protruding members at a hinge portion of the first half; and a second half having recesses at a hinge portion of the second half, each recess having an opening which is constricted relative to the blind end of the recess;

wherein a pivotal connection is formed between the first and second halves such that the package is moveable between an open position to access the optical media and an enclosed position to protect the optical media from damage, the pivotal connection being formed by sliding the protruding member into the recess causing the opening to resiliently deform and allow the blind end to receive the protruding member.

The radial cross-section of the protruding members may be substantially circular and the radial cross-section of the blind end of the recesses may be substantially semi-circular.

The protruding member may be inwardly facing and have an enlarged head at its free end to secure the protruding member within the recess.

The second half may comprise a slot positioned proximal to each recess to allow the opening to be outwardly deformed in a direction towards the slot when the enlarged head enters the recess via the opening and is received within the blind end.

The slot may be "V" shaped and may have a shorter depth than the recess.

Each opening may be constricted by curved members partially extending over an upper portion of the opening.

The resiliently flexible plastics material may be polypropylene.

The optical media may be any one from the group consisting of: Compact Disc (CD), Digital Versatile Disc (DVD), Blu-ray Disc, and HD DVD.

BRIEF DESCRIPTION OF THE DRAWINGS

An example of the invention will now be described with reference to the accompanying drawings, in which.

DETAILED DESCRIPTION OF THE DRAWINGS

Figure 1:
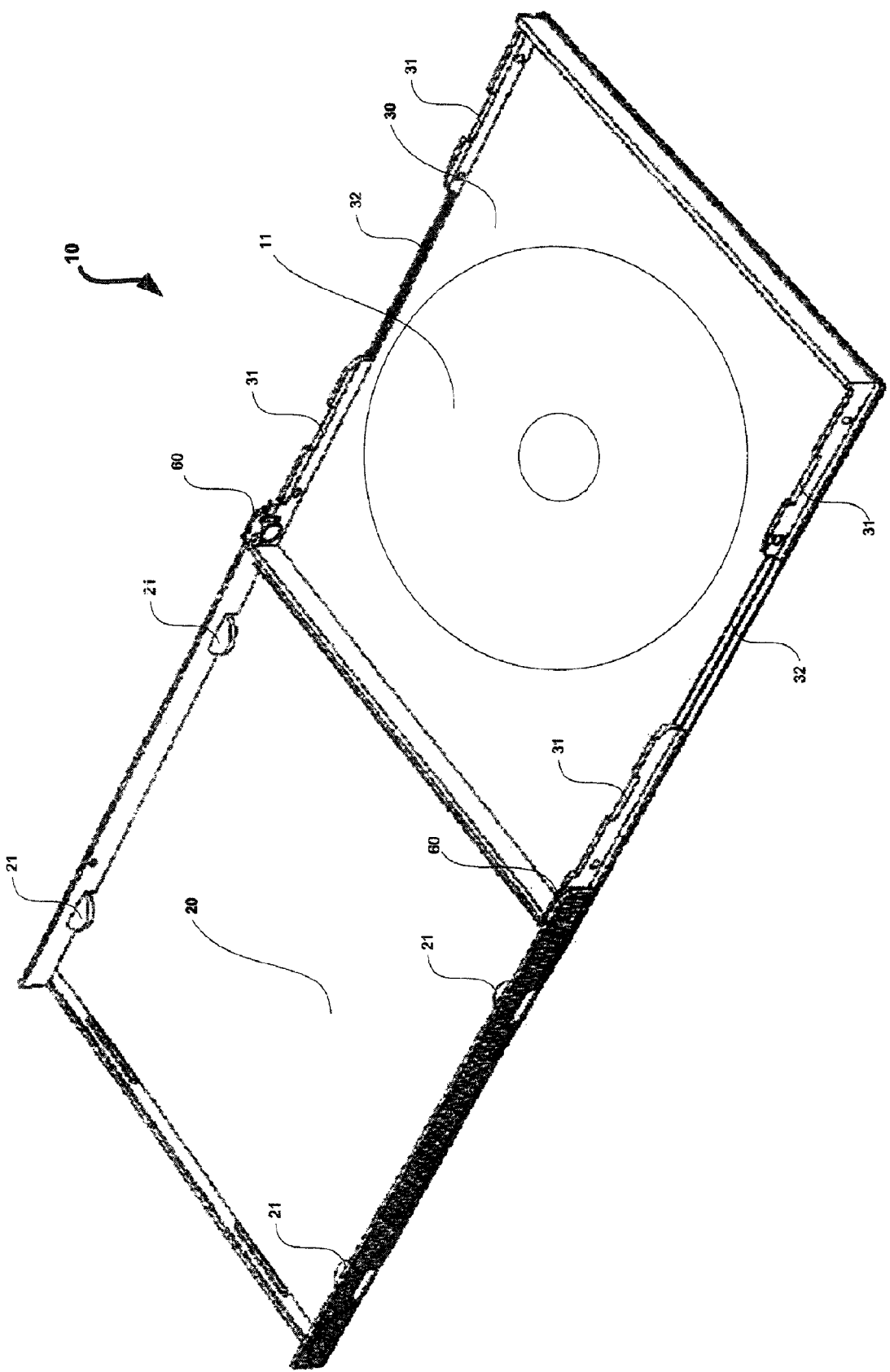
FIG. 1 is a perspective plan view of a case in accordance with a preferred embodiment of the present invention.

Referring to FIG. 1, an optical disc package 10 for containing optical media 11 is provided. The package 10 is made solely from a resiliently flexible plastics material, preferably, polypropylene. Optical media 11 includes Compact Discs (CD), Digital Versatile Discs (DVD), Blu-ray Discs, and HD DVD discs. The package 10 comprises two halves 20, 30 connected by hinges 60.

Figure 2:
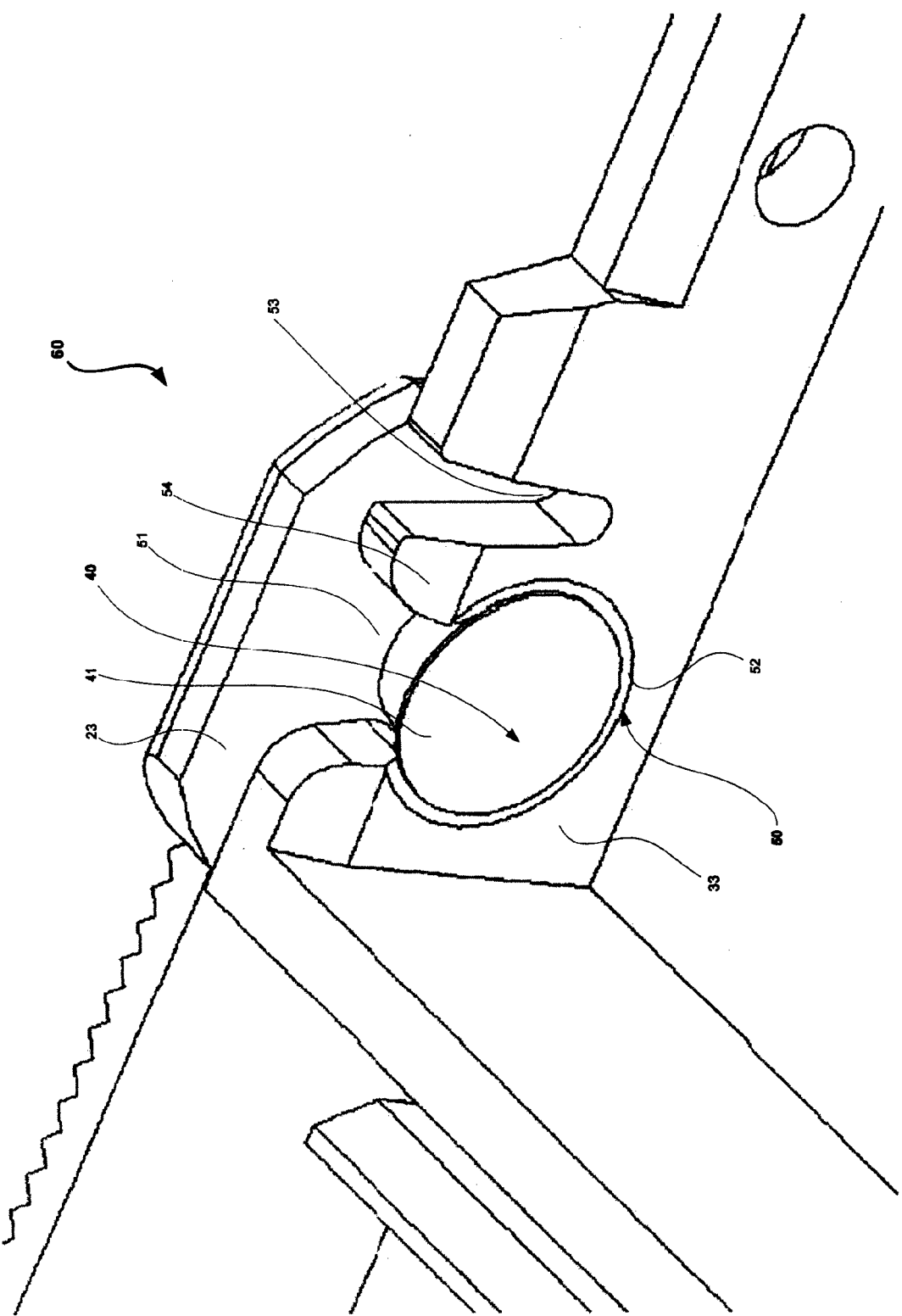
FIG. 2 is an enlarged view of hinge portions of first and second halves of the case of FIG. 1.
Figure 3:
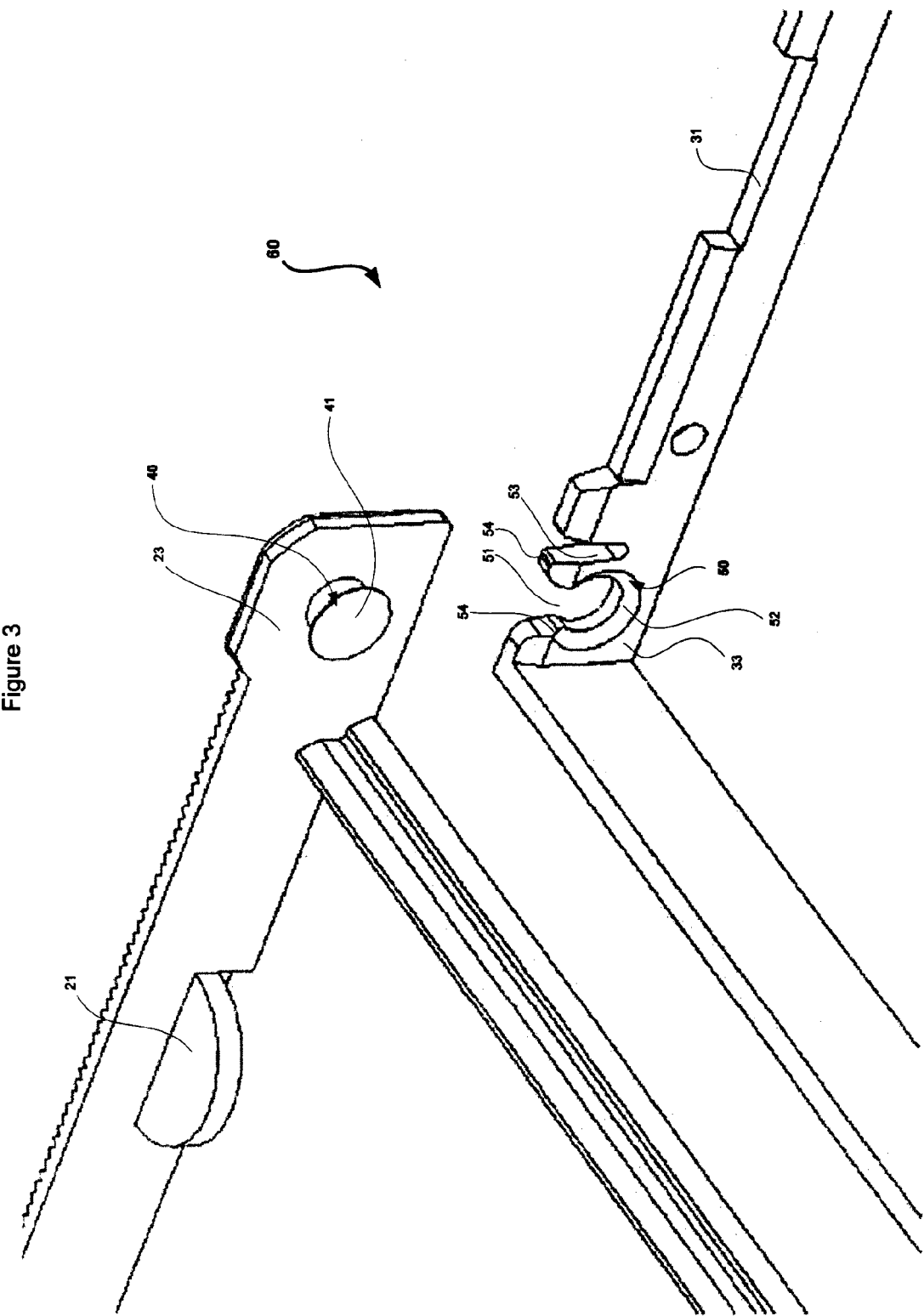
FIG. 3 is an enlarged view of the hinge portions when the first and second halves are detached from each other.

Referring to FIGS. 2 and 3, the hinges 60 are formed by sliding protruding members 40 at a hinge portion 23 of the first half 20 into recesses 50 at a hinge portion 33 of the second half 30. Each recess 50 has an opening 51 which is constricted relative to the blind end 52 of the recess 50. The radial cross-section of the protruding members 40 is substantially circular and the radial cross-section of the blind end 52 of the recesses 50 is substantially semi-circular. This facilitates easy rotational movement of the hinges 60.

The opening 51 of the recess 50 is constricted by curved members 54 partially extending over an upper portion of the opening 51. The protruding members 40 are slid into the recesses 50 causing the constricted openings 51 to resiliently deform. The blind end 52 then receives the protruding member 40. A pivotal connection is formed between the first and second halves 20, 30 such that the package 10 is moveable between an open position to access the optical media 11 and an enclosed position to protect the optical media 11 from damage.

The protruding members 40 are inwardly facing and have an enlarged head 41 at its free end. The enlarged head 41 assists with securing the protruding member 40 within the recess 50.

The second half 30 comprises a slot 53 positioned proximal to each recess 50 to allow the opening 51 to be outwardly deformed in a direction towards the slot 53 when the protruding member 40 enters the recess 50 via the opening 51 and is received within the blind end 52. Preferably, the slot 53 is "V" shaped and has a shorter depth than the recess 50.

Similar to traditional optical disc packages, there are four tabs 21 on the first half 20 to keep liner notes in place, such as a 120 mm×120 mm booklet, or a single 242 mm×120 mm leaf folded in half. Four recesses 31 on the second half 30 are cut out from the side wall of the second half 30 so that the four tabs 21 sit in the recesses 31 when the optical disc package 10 is in the enclosed position. There are also two elongate cut outs 32 in a middle portion of the side wall of the second half 30 which allows a user to easily remove the optical media 11 from the second half 30 with their fingers.

Although it has been described that the protruding members 40 and recesses 50 are on specific halves, they may be reversed and located on the other half.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed is:

1. An optical disc package for containing optical media, the package being made solely from a polypropylene resiliently flexible plastics material, the package comprising:
   a first half having protruding members at a hinge portion of the first half; and
   a second half having recesses and slots at a hinge portion of the second half, each recess having an opening which is constricted relative to the blind end of the recess and each slot positioned proximal to each recess to allow the opening to be outwardly deformed in a direction towards the slot when the protruding member enters the recess via the opening and is received within the blind end;
   wherein a pivotal connection is formed between the first and second halves such that the package is moveable between an open position to access the optical media and an enclosed position to protect the optical media from damage, the pivotal connection being formed by sliding the protruding member into the recess causing the opening to resiliently deform and allow the blind end to receive the protruding member.

2. The package according to claim 1, wherein the radial cross-section of the protruding members is substantially circular and the radial cross-section of the blind end of the recesses is substantially semi-circular.

3. The package according to claim 1, wherein the protruding member is inwardly facing and has an enlarged head at its free end to secure the protruding member within the recess.

4. The package according to claim 1, wherein the slot is "V" shaped and has a shorter depth than the recess.

5. The package according to claim 4, wherein each opening is constricted by curved members partially extending over an upper portion of the opening.

6. The package according to claim 1, wherein the optical media is any one from the group consisting of: Compact Disc (CD), Digital Versatile Disc (DVD), Blu-ray Disc, and HD DVD.

* * * * *